US012340937B2

(12) United States Patent
Takeuchi et al.

(10) Patent No.: US 12,340,937 B2
(45) Date of Patent: Jun. 24, 2025

(54) COIL COMPONENT AND MANUFACTURING METHOD THEREFOR

(71) Applicant: TDK Corporation, Tokyo (JP)

(72) Inventors: Takuya Takeuchi, Tokyo (JP); Naoaki Fujii, Tokyo (JP); Nobuya Takahashi, Tokyo (JP)

(73) Assignee: TDK Corporation, Tokyo (JP)

( * ) Notice: Subject to any disclaimer, the term of this patent is extended or adjusted under 35 U.S.C. 154(b) by 730 days.

(21) Appl. No.: 17/767,226

(22) PCT Filed: Sep. 29, 2020

(86) PCT No.: PCT/JP2020/036858

§ 371 (c)(1),
(2) Date: Apr. 7, 2022

(87) PCT Pub. No.: WO2021/079697

PCT Pub. Date: Apr. 29, 2021

(65) Prior Publication Data

US 2022/0375679 A1 Nov. 24, 2022

(30) Foreign Application Priority Data

Oct. 23, 2019 (JP) ................................ 2019-192946

(51) Int. Cl.
*H01F 27/29* (2006.01)
*H01F 17/00* (2006.01)
(Continued)

(52) U.S. Cl.
CPC ....... *H01F 27/292* (2013.01); *H01F 17/0013* (2013.01); *H01F 27/324* (2013.01); *H01F 41/041* (2013.01); *H01F 2017/0073* (2013.01)

(58) Field of Classification Search
CPC .. H01F 27/292; H01F 17/0013; H01F 27/324; H01F 41/041; H01F 2017/0073
See application file for complete search history.

(56) References Cited

U.S. PATENT DOCUMENTS 5,386,206 A * 1/1995 Iwatani ................. H01F 41/046 336/200
2016/0379750 A1 12/2016 Hamada et al.
(Continued)

FOREIGN PATENT DOCUMENTS

JP 2007242800 A * 9/2007
JP 2017-011185 A 1/2017
WO 2016/208305 A1 12/2016

OTHER PUBLICATIONS

International Search Report issued in corresponding International Patent Application No. PCT/JP2020/036858, dated Dec. 1, 2020, with English translation.

*Primary Examiner* — Malcolm Barnes
(74) *Attorney, Agent, or Firm* — Rimon P.C.

(57) ABSTRACT

To improve magnetic characteristics of a coil component having a structure in which an interlayer insulating film is provided between a spiral coil pattern and a magnetic element body. A coil component 1 includes: an interlayer insulating film 41 covering coil patterns CP1 to CP3 from one side in the axial direction of the coil patterns; a magnetic element body M1 filled in the inner diameter areas of the coil patterns CP1 to CP3; and a magnetic element body M2 covering the coil patterns CP1 to CP3 from the one side in the axial direction through the interlayer insulating film 41. The interlayer insulating film 41 has a protruding part 41A radially protruding to the inner diameter area, and the protruding part 41A is curved to the other side in the axial direction. Since the protruding part 41A is curved in the axial direction, the entrance of a magnetic path passing through the inner diameter area is made wider than when the protruding part 41A linearly protrudes to the inner diameter area. This suppresses deterioration in magnetic characteristics due to the presence of the protruding part 41A.

8 Claims, 23 Drawing Sheets

1

(51) Int. Cl.
*H01F 27/32* (2006.01)
*H01F 41/04* (2006.01)

(56) References Cited

U.S. PATENT DOCUMENTS

2017/0169930 A1* 6/2017 Kudo .................. H01F 17/0013
2018/0108475 A1* 4/2018 Hamada .................. H01F 41/02
2020/0265990 A1* 8/2020 Yoshioka ............ H01F 17/0006

* cited by examiner

1

COIL COMPONENT AND MANUFACTURING METHOD THEREFOR

CROSS REFERENCE TO RELATED APPLICATIONS

This application is the U.S. National Phase under 35 US.C. § 371 of International Application No. PCT/JP2020/036858, filed on Sep. 29, 2020, which claims the benefit of Japanese Application No. 2019-192946, filed on Oct. 23, 2019, the entire contents of each are hereby incorporated by reference.

TECHNICAL FIELD

The present invention relates to a coil component and a manufacturing method therefor and, more particularly, to a coil component having a structure in which a spiral coil pattern is covered with a magnetic element body and a manufacturing method for such a coil component.

BACKGROUND ART

A chip-type coil component having a spiral coil pattern is sometimes covered with a magnetic element body so as to increase its inductance. For example, Patent Document 1 discloses a coil component having a structure in which a spiral coil pattern is covered with a magnetic element body.

However, materials constituting the magnetic element body are insufficient in insulation performance as compared to resin materials. Thus, the chip-type coil component employs not a structure in which the coil pattern is directly covered with the magnetic element body but a structure in which the coil pattern is covered with an interlayer insulating film made of a resin material and is further covered at its surface with the magnetic element body.

CITATION LIST

Patent Document

[Patent Document 1] JP 2017-011185A

SUMMARY OF THE INVENTION

Problem to be Solved by the Invention

As described in Patent Document 1, when the interlayer insulating film is provided between the coil pattern and the magnetic element body, the interlayer insulating film partly protrudes to the inner diameter area of the coil pattern. In particular, when a part of the interlayer insulating film that is positioned at the end portion in the coil axis direction significantly protrudes to the inner diameter area, the entrance of a magnetic path constituted by the inner diameter area is narrowed correspondingly, which deteriorates magnetic characteristics.

An object of the present invention is therefore to suppress, in a coil component having a structure in which an interlayer insulating film is provided between a spiral coil pattern and a magnetic element body, deterioration in magnetic characteristics caused due to protrusion of the interlayer insulating film to the inner diameter area of the coil pattern. Another object of the present invention is to provide a manufacturing method for such a coil component.

Means for Solving the Problem

A coil component according to the present invention includes: a spirally wound coil pattern; a first interlayer insulating film covering the coil pattern from one side in the axial direction of the coil pattern; and a magnetic element body including a first part filled in the inner diameter area of the coil pattern and a second part covering the coil pattern from the one side in the axial direction through the first interlayer insulating film. The first interlayer insulating film has a first protruding part radially protruding to the inner diameter area, and the first protruding part is curved to the other side in the axial direction.

According to the present invention, the first protruding part is curved in the axial direction, so that the entrance of a magnetic path passing through the inner diameter area becomes wider than when the first protruding part linearly protrudes to the inner diameter area. This can suppress deterioration in magnetic characteristics caused due to the presence of the first protruding part.

The coil component according to the present invention may further include a second interlayer insulating film covering the coil pattern from the other side in the axial direction, and the magnetic element body may further include a third part covering the coil pattern from the other side in the axial direction through the second interlayer insulating film. With this configuration, higher magnetic characteristics can be obtained.

The coil component according to the present invention may further include first and second external terminals connected respectively to one end and the other end of the coil pattern each through an opening portion formed in the second interlayer insulating film, and the first interlayer insulating film may be smaller in film thickness than the second interlayer insulating film. Thus, since the film thickness of the first interlayer insulating film positioned on the side opposite to the external terminals is small, the height of the coil component can be reduced.

In the present invention, the second interlayer insulating film may have a second protruding part radially protruding to the inner diameter area, and the second protruding part may be curved to the one side in the axial direction. Since the second protruding part is curved in the axial direction, the entrance of a magnetic path passing through the inner diameter area becomes wider than when the second protruding part linearly protrudes to the inner diameter area. This can suppress deterioration in magnetic characteristics caused due to the presence of the protruding part.

In the present invention, the first protruding part may be curved more significantly than the second protruding part. This can further suppress deterioration in magnetic characteristics due to the protrusion of the first protruding part.

In the present invention, the magnetic element body may be a composite member containing magnetic filler and a resin binder, and the protruding amount of the first protruding part may be smaller than the maximum diameter of the magnetic filler. This makes a void less likely to occur in the vicinity of the first protruding part.

A coil component manufacturing method according to the present invention includes: a first step of forming a spirally wound coil pattern covered with an interlayer insulating film from one side in the axial direction thereof; a second step of forming, in the interlayer insulating film, a protruding part radially protruding to the inner diameter area of the coil pattern; and a third step of filling the inner diameter area of the coil pattern with a magnetic element body and covering the coil pattern with the magnetic element body from the one side in the axial direction through the interlayer insulating film. In the third step, the magnetic element body is pressed toward the other side in the axial direction so as to curve the first protruding part to the other side in the axial direction.

According to the present invention, since the protruding part is curved by pressing the magnetic element body, the entrance of a magnetic path passing through the inner diameter area can be made wide. This can suppress deterioration in magnetic characteristics caused due to the presence of the protruding part.

In the present invention, the first step may include a step of forming the interlayer insulating film such that a part of the interlayer insulating film that overlaps the inner diameter area of the coil pattern when viewed in the axial direction includes a large thickness area and a small thickness area, and the second step may reduce the film thickness of the interlayer insulating film as a whole to remove the small thickness area to thereby form the protruding part. This can reduce the thickness of the protruding part, allowing the protruding part to be curved more significantly.

Advantageous Effects of the Invention

As described above, according to the present invention, in a coil component having a structure in which a spiral coil pattern is covered with a magnetic element body, it is possible to suppress deterioration in magnetic characteristics caused due to protrusion of an interlayer insulating film to the inner diameter area of the coil pattern. Further, according to the present invention, there can be provided a manufacturing method for such a coil component.

MODE FOR CARRYING OUT THE INVENTION

Hereinafter, preferred embodiments of the present invention will be described in detail with reference to the accompanying drawings.

Figure 1:
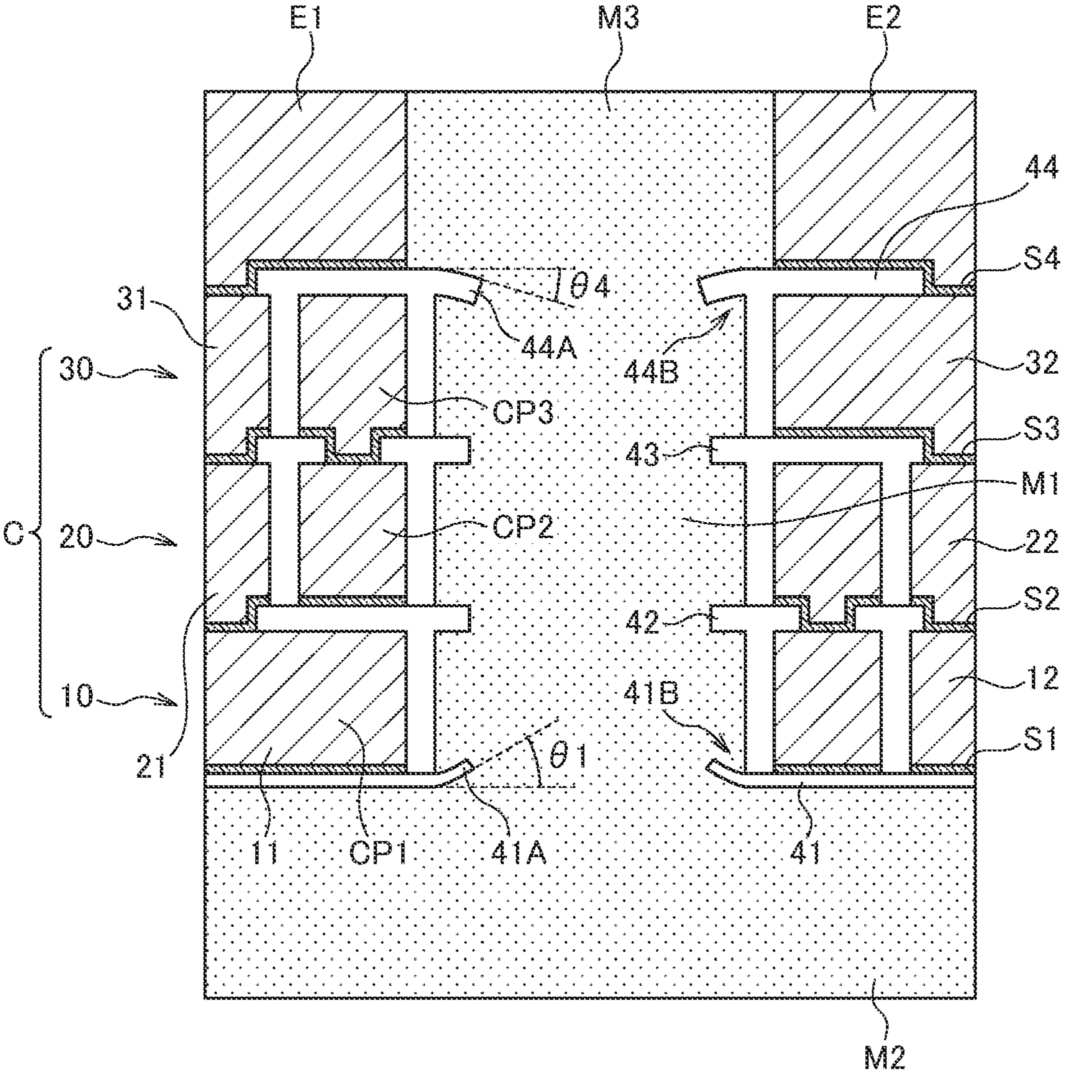
FIG. 1 is a schematic cross-sectional view for explaining the structure of a coil component 1 according to an embodiment of the present invention.
Figure 2:
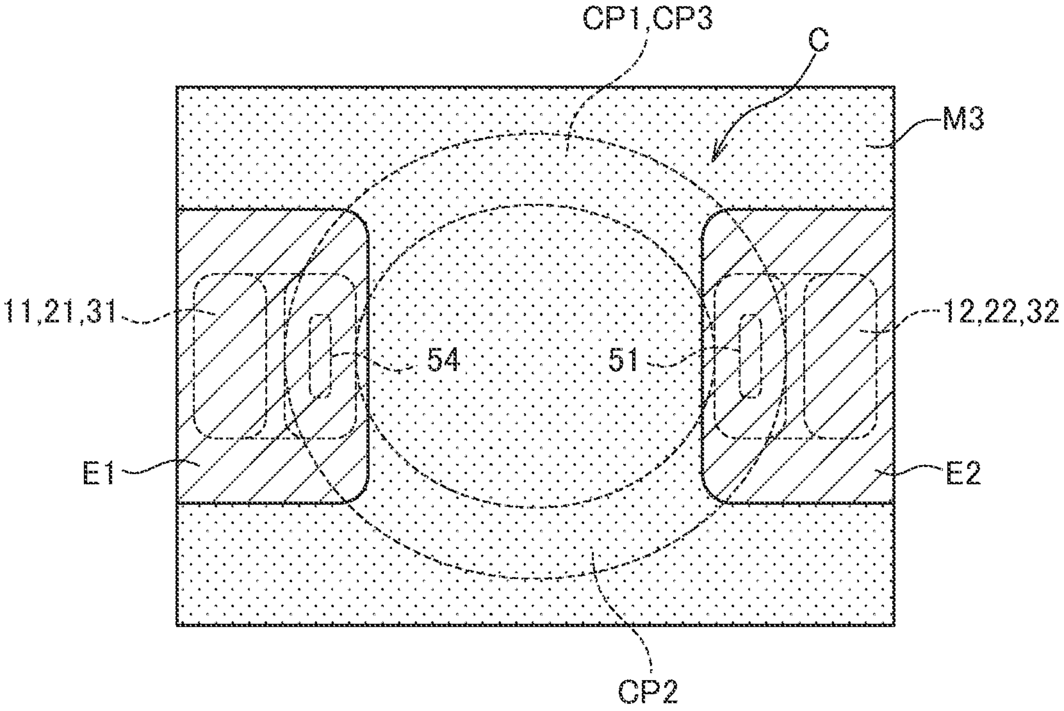
FIG. 2 is a schematic plan view illustrating, in a transparent manner, the outer appearance of the coil component 1 as viewed in the axial direction of the coil component 1.

FIG. 1 is a schematic cross-sectional view for explaining the structure of a coil component 1 according to an embodiment of the present invention. FIG. 2 is a schematic plan view illustrating, in a transparent manner, the outer appearance of the coil component 1 as viewed in the axial direction of the coil component 1.

The coil component 1 according to an embodiment of the present invention is a surface-mount type chip component suitably used as an inductor for a power supply circuit and has, as illustrated in FIGS. 1 and 2, a magnetic element bodies M1 to M3, a coil part C embedded in the magnetic element bodies M1 to M3. Although the configuration of the coil part C will be described later, in the present embodiment, three conductor layers each having a spiral coil pattern are stacked to form one coil conductor. One end of the coil conductor is connected to a first external terminal E1, and the other end thereof is connected to a second external terminal E2.

The magnetic element bodies M1 to M3 are each a composite member containing magnetic metal filler made of iron (Fe) or a permalloy-based material and a resin binder and form a magnetic path of magnetic flux generated by a current flowing in the coil part C. The resin binder is preferably epoxy resin of liquid or powder. The magnetic element bodies M1 to M3 may be made of the same material or mutually different materials. The magnetic element body M1 is a part (first part) filled in the inner diameter area of the coil part C, the magnetic element body M2 is a part (second part) covering the coil part C from one side in the axial direction of the coil part C, and the magnetic element body M3 is a part (third part) covering the coil part C from the other side in the axial direction.

As illustrated in FIG. 1, the coil part C has alternately stacked interlayer insulating films 41 to 44 and conductor layers 10, 20, and 30. The conductor layers 10, 20 and 30 have spiral coil patterns CP1 to CP3, respectively, and the upper or lower surfaces of the coil patterns CP1 to CP3 are covered with the interlayer insulating films 41 to 44. The side surfaces of the coil patterns CP1 to CP3 are covered respectively with parts of the respective interlayer insulating films 42 to 44. The above-mentioned upper and lower surfaces of the coil patterns CP1 to CP3 each refer to a surface perpendicular to the coil axis, and the side surfaces of the coil patterns CP1 to CP3 each refer to a surface parallel to the coil axis.

The coil patterns CP1 to CP3 are mutually connected through through holes formed in the interlayer insulating films 42 and 43 to constitute the coil part C. The conductor layers 10, 20, and 30 are preferably made of copper (Cu). Out of the interlayer insulating films 41 to 44, at least the interlayer insulating films 42 and 43 are each made of a non-magnetic material. The lowermost interlayer insulating film 41 and the uppermost interlayer insulating film 44 may each be made of a magnetic material.

Figure 3:
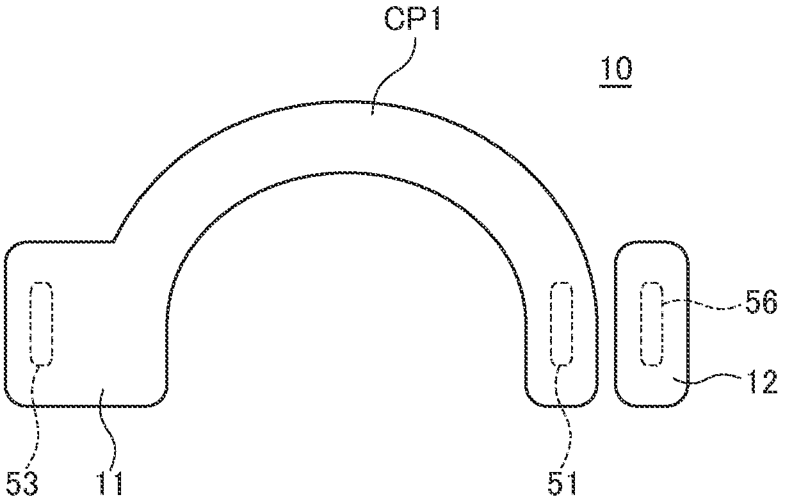
FIG. 3 is a schematic plan view for explaining a pattern shape of the conductor layer 10.

The conductor layer 10 is the first conductor layer formed on the upper surface of the magnetic element body M2 through the interlayer insulating film 41 and includes an underlying seed layer S1. As illustrated in FIG. 3, the conductor layer 10 has the coil pattern CP1 spirally wound in 0.5 turns and two electrode patterns 11 and 12. The lower surface of the coil pattern CP1 is covered with the interlayer insulating film 41, and the side and upper surfaces thereof are covered with the interlayer insulating film 42. As illustrated in FIGS. 1 and 3, in a predetermined cross section, the coil pattern CP1 and the electrode pattern 11 are connected, whereas the electrode pattern 12 is provided independently of the coil pattern CP1. The electrode pattern 11 is exposed from the magnetic element body M3, and the surface thereof is used as a side electrode having the same potential as that of the external terminal E1. Similarly, the electrode pattern 12 is exposed from the magnetic element body M3, and the surface thereof is used as a side electrode having the same potential as that of the external terminal E2.

Figure 4:
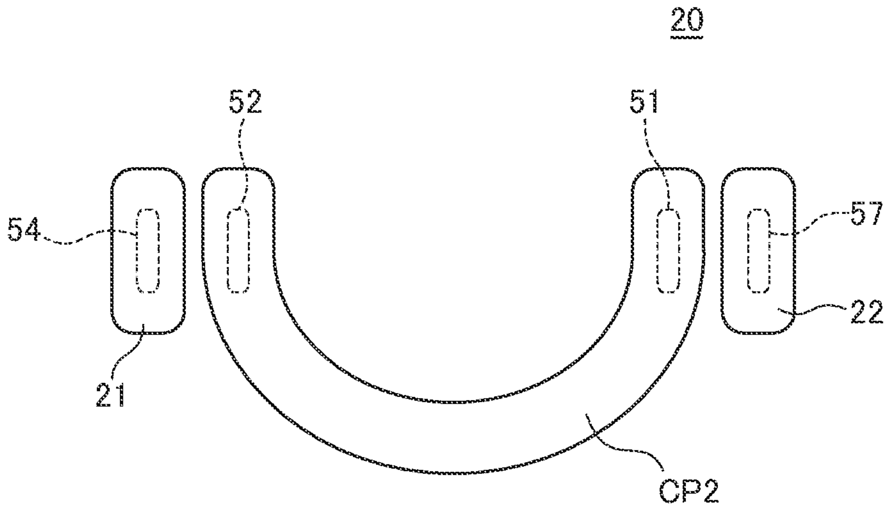
FIG. 4 is a schematic plan view for explaining a pattern shape of the conductor layer 20.

The conductor layer 20 is the second conductor layer formed on the upper surface of the conductor layer 10 through the interlayer insulating film 42 and includes an underlying seed layer S2. As illustrated in FIG. 4, the conductor layer 20 has the coil pattern CP2 spirally wound in 0.5 turns and two electrode patterns 21 and 22. The lower surface of the coil pattern CP2 is covered with the interlayer insulating film 42, and the side and upper surfaces thereof are covered with the interlayer insulating film 43. Both the electrode patterns 21 and 22 are provided independently of the coil pattern CP2. The electrode pattern 21 is exposed from the magnetic element body M3, and the surface thereof is used as a side electrode having the same potential as that of the external terminal E1. Similarly, the electrode pattern 22 is exposed from the magnetic element body M3, and the surface thereof is used as a side electrode having the same potential as that of the external terminal E2.

Figure 5:
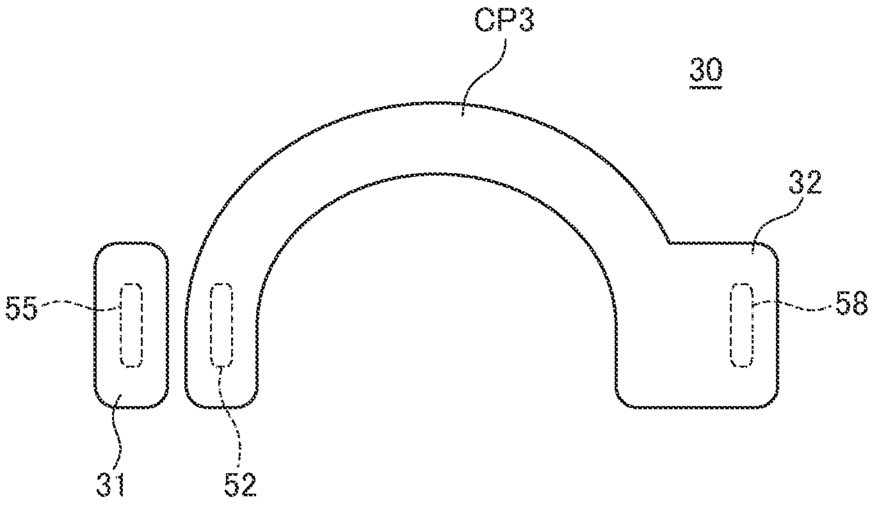
FIG. 5 is a schematic plan view for explaining a pattern shape of the conductor layer 30.

The conductor layer 30 is the third conductor layer formed on the upper surface of the conductor layer 20 through the interlayer insulating film 43 and includes an underlying seed layer S3. As illustrated in FIG. 5, the conductor layer 30 has the coil pattern CP3 spirally wound in 0.5 turns and two electrode patterns 31 and 32. The lower surface of the coil pattern CP3 is covered with the interlayer insulating film 43, and the side and upper surfaces thereof are covered with the interlayer insulating film 44. As illustrated in FIG. 1, in a predetermined cross section, the coil pattern CP3 and the electrode pattern 32 are connected, whereas the electrode pattern 31 is provided independently of the coil pattern CP3. The electrode pattern 31 is exposed from the magnetic element body M3, and the surface thereof is used as a side electrode having the same potential as that of the external terminal E1. Similarly, the electrode pattern 32 is exposed from the magnetic element body M3, and the surface thereof is used as a side electrode having the same potential as that of the external terminal E2.

The coil patterns CP1 and CP2 are connected to each other through a via conductor 51 constituting a part of the conductor layer 20 and penetrating the interlayer insulating film 42. The coil patterns CP2 and CP3 are connected to each other through a via conductor 52 constituting a part of the conductor layer 30 and penetrating the interlayer insulating film 43. As a result, a 1.5-turn coil conductor is formed by the coil patterns CP1 to CP3. The electrode patterns 11, 21, and 31 are connected in common to the external terminal E1 through via conductors 53 to 55, and the electrode patterns 12, 22, and 32 are connected in common to the external terminal E2 through via conductors 56 to 58. As a result, one end of a coil conductor constituted by the coil patterns CP1 to CP3 is connected to the external terminal E1, and the other end thereof is connected to the external terminal E2.

In the present embodiment, the film thickness of the interlayer insulating film 41 is smaller than those of the interlayer insulating films 42 to 44, thereby achieving a reduction in height. Although the interlayer insulating films 41 to 44 need to have a certain film thickness in order to carry out manufacturing processes to be described later, the film thickness of the interlayer insulating film 41 positioned in the lowermost layer can be made smaller than those of the interlayer insulating films 42 to 44 by reducing the film thickness by asking after fabrication of the coil part C and before formation of the magnetic element body M2.

Further, in the present embodiment, the interlayer insulating films 41 to 44 each partly protrude to the inner diameter area of the coil part C. Out of the protruding parts of the interlayer insulating films 41 to 44, a protruding part 41A of the interlayer insulating film 41 and a protruding part 44A of the interlayer insulating film 44 are each curved toward the center of the coil part C. Specifically, the protruding part 41A is curved in the upward direction of FIG. 1 toward the magnetic element body M3, and the protruding part 44A is curved in the downward direction of FIG. 1 toward the magnetic element body M2. With this configuration, the opening diameters of the interlayer insulating films 41 and 44 are increased as compared to when the protruding parts 41A and 44A linearly protrude in the radial direction, thereby improving magnetic characteristics.

Further, in the present embodiment, a curving angle $\theta 1$ of the protruding part 41A is larger than a curving angle $\theta 4$ of the protruding part 44A ($\theta 1 > \theta 4$). That is, the protruding part 41A is curved more significantly than the protruding part 44A. Such a structure can be obtained by making the film thickness of the interlayer insulating film 41 smaller than those of the interlayer insulating films 42 to 44, as described above. The more significantly the protruding part 41A is curved, the larger the opening diameter of the interlayer insulating film 41 is, thereby further improving magnetic characteristics.

The curving of the protruding parts 41A and 44A reduces the volume of a corner part 41B at which the protruding part 41A and the vertical portion of the interlayer insulating film 42 contact each other and reduces the volume of a corner part 44B at which the protruding part 44A and the vertical portion of the interlayer insulating film 44 contact each other. This makes magnetic filler having a large diameter less likely to enter the corner parts 41B and 44B, making it possible to suppress generation of a void. In particular, the protruding amount of each of the protruding parts 41A and 44A is preferably smaller than the maximum diameter of the magnetic filler contained in the magnetic element bodies M1 to M3. This makes a void much less likely to occur in the corner parts 41B and 44B.

The following describes a manufacturing method for the coil component 1 according to the present embodiment.

FIGS. 6 to 34 are process views for explaining the manufacturing method for the coil component 1 according to the present embodiment. Although the process views illustrated in FIGS. 6 to 34 each illustrate a cross section corresponding to one coil component 1, a plurality of coil components 1 can actually be assembled at a time using an aggregate substrate to consequently produce multiple separate coil components.

Figure 6:
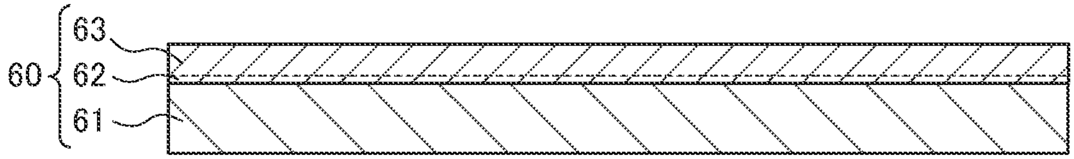
FIG. 6 is a process view for explaining the manufacturing method for the coil component 1.
Figure 7:
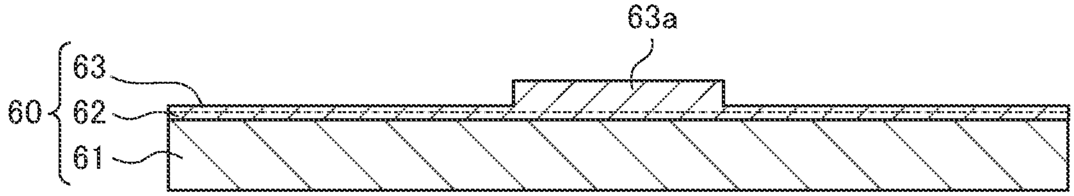
FIG. 7 is a process view for explaining the manufacturing method for the coil component 1.

A support 60 having a structure in which metal foils 62 and 63 such as copper (Cu) foils are provided on the surface of a base 61 is prepared (FIG. 6). A peeling layer is provided at the interface between the metal foils 62 and 63. Then, the metal foil 63 is patterned to form a protruding part 63*a* protruding from the metal foil 63 (FIG. 7).

Figure 8:
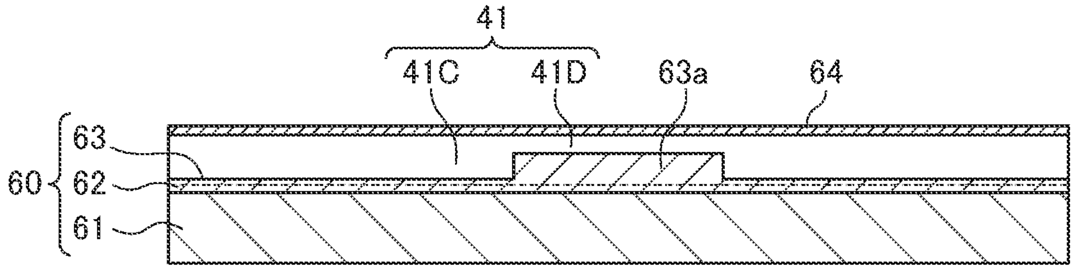
FIG. 8 is a process view for explaining the manufacturing method for the coil component 1.
Figure 9:
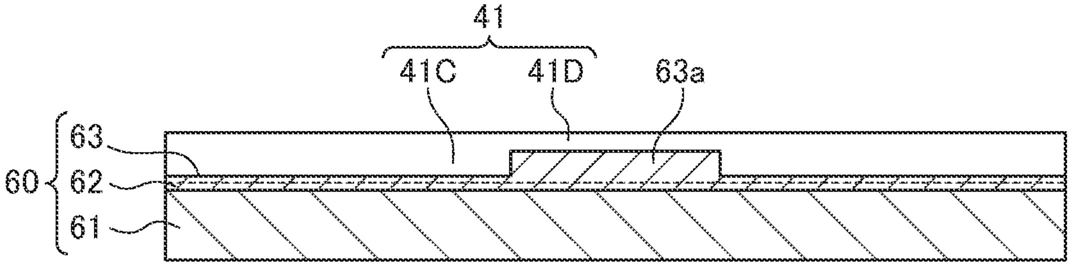
FIG. 9 is a process view for explaining the manufacturing method for the coil component 1.

Then, the interlayer insulating film 41 and a metal foil 64 are formed on the surface of the metal foil 63 having the protruding part 63*a* (FIG. 8). The interlayer insulating film 41 and the metal foil 64 can be formed by a laminate method. As a result, the shape of the protruding part 63*a* is transferred to the interlayer insulating film 41, and thus the interlayer insulating film 41 has a large thickness area 41C and a small thickness area 41D.

Figure 10:
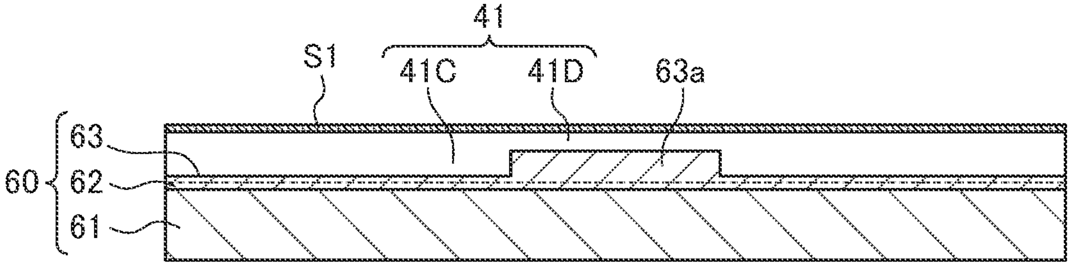
FIG. 10 is a process view for explaining the manufacturing method for the coil component 1.

After removal of the metal foil 64 by etching (FIG. 9), electroless plating is performed to form a seed layer S1 on the surface of the interlayer insulating film 41 (FIG. 10). The metal foil 64 may be used as a seed layer in place of forming the seed layer S1; however, the seed layer S1 is preferably as thin as possible, so that a thinner seed layer S1 is preferably newly formed after the removal of the metal foil 64.

Figure 11:
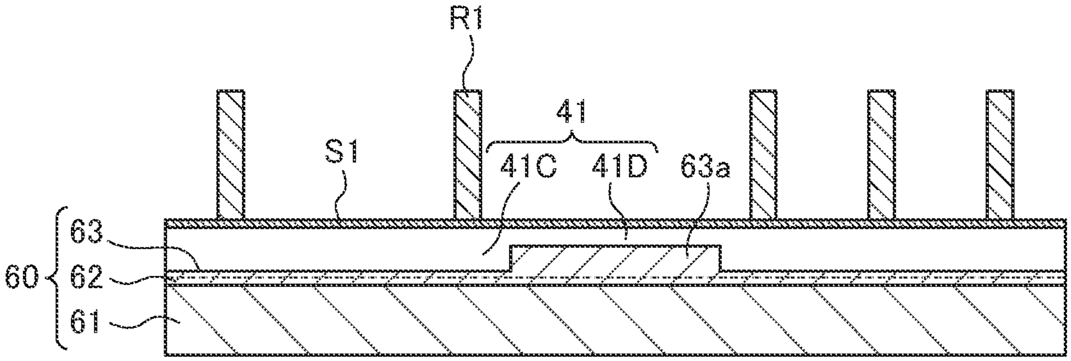
FIG. 11 is a process view for explaining the manufacturing method for the coil component 1.
Figure 12:
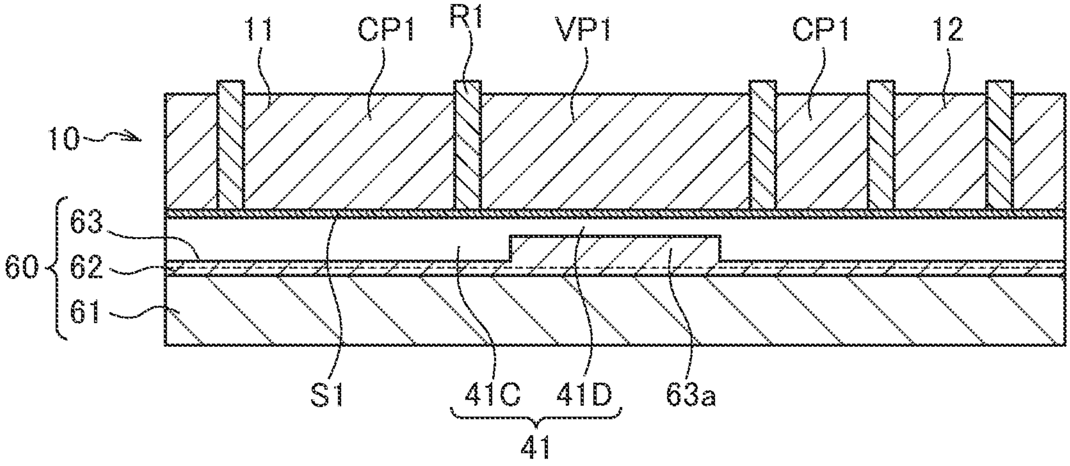
FIG. 12 is a process view for explaining the manufacturing method for the coil component 1.
Figure 13:
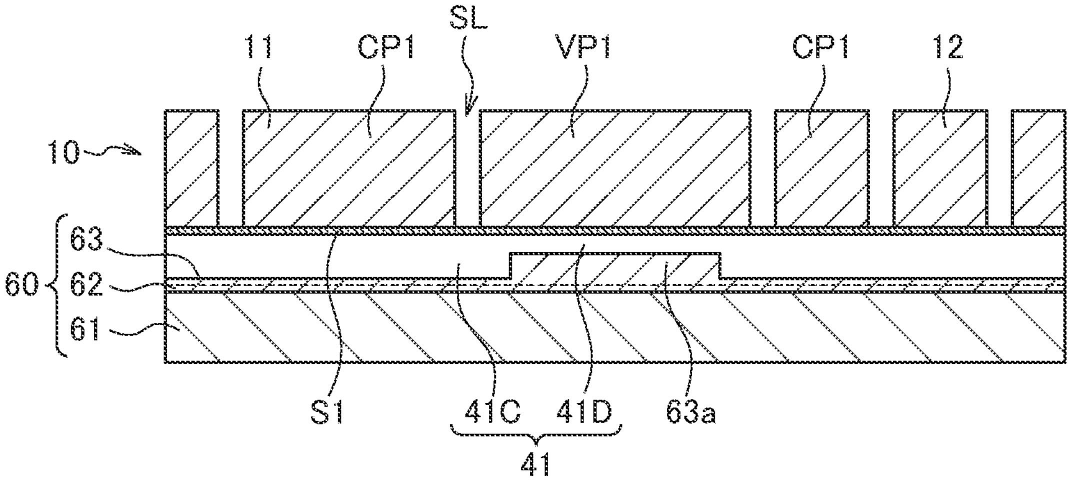
FIG. 13 is a process view for explaining the manufacturing method for the coil component 1.

Then, a resist pattern R1 is formed on the surface of the seed layer S1 (FIG. 11). The resist pattern R1 serves as a negative pattern of the conductor layer 10. In this state, electrolytic plating is performed to grow the seed layer S1 to thereby form the conductor layer 10 (FIG. 12). At this time, a sacrificial pattern VP1 is formed in the inner and outer diameter areas of the coil pattern CP1. The position of the resist pattern R1 is adjusted such that a part of the sacrificial pattern VP1 that is positioned in the inner diameter area of the coil pattern CP1 overlaps the entire small thickness area 41D of the interlayer insulating film 41 and a part of the large thickness area 41C.

Figure 14:
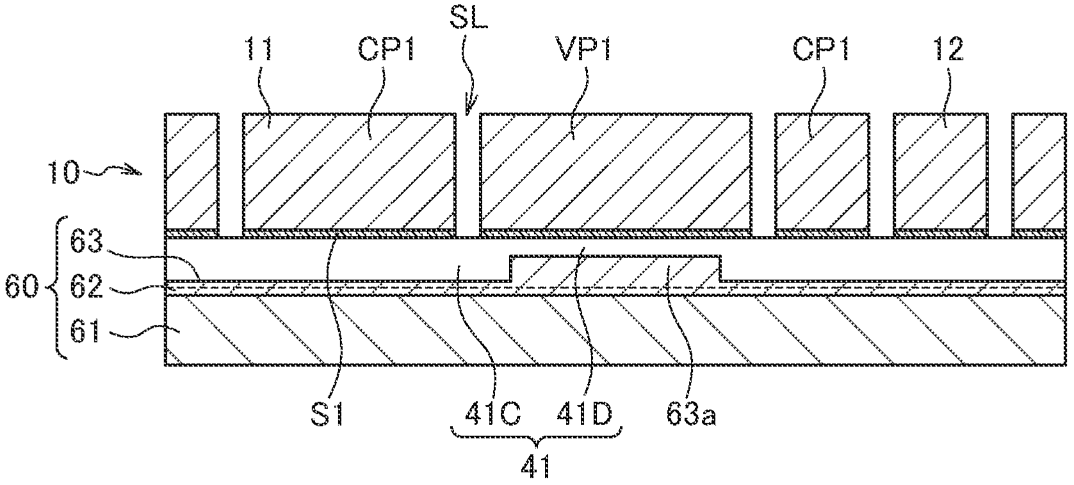
FIG. 14 is a process view for explaining the manufacturing method for the coil component 1.
Figure 15:
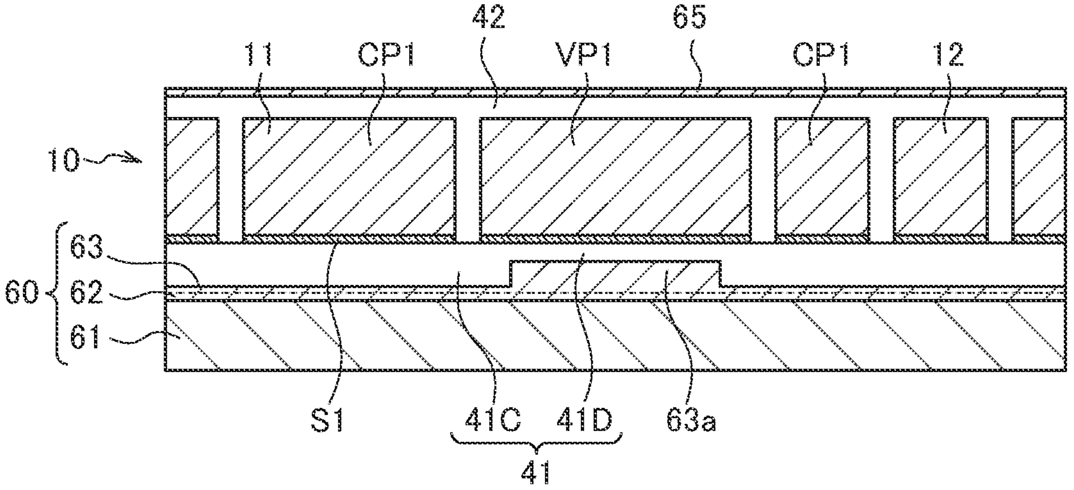
FIG. 15 is a process view for explaining the manufacturing method for the coil component 1.
Figure 16:
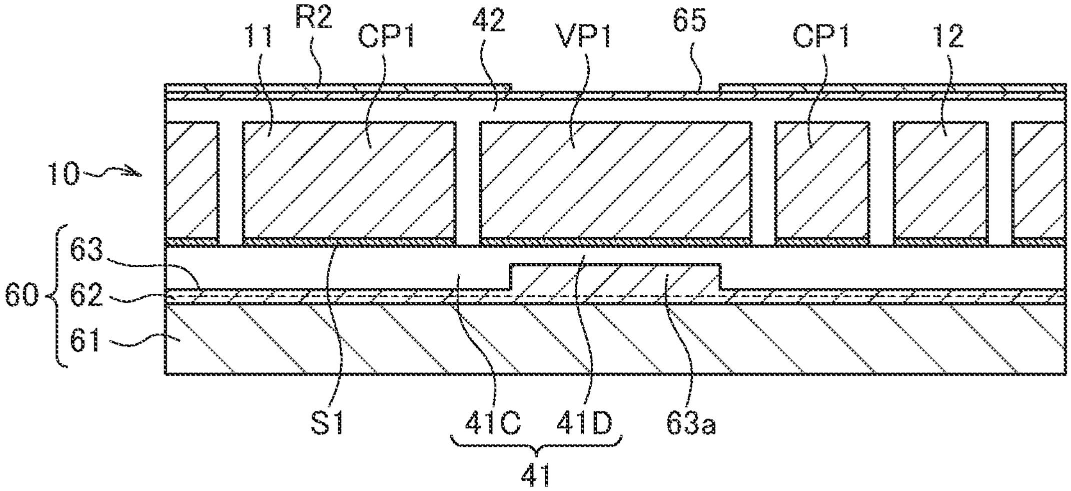
FIG. 16 is a process view for explaining the manufacturing method for the coil component 1.
Figure 17:
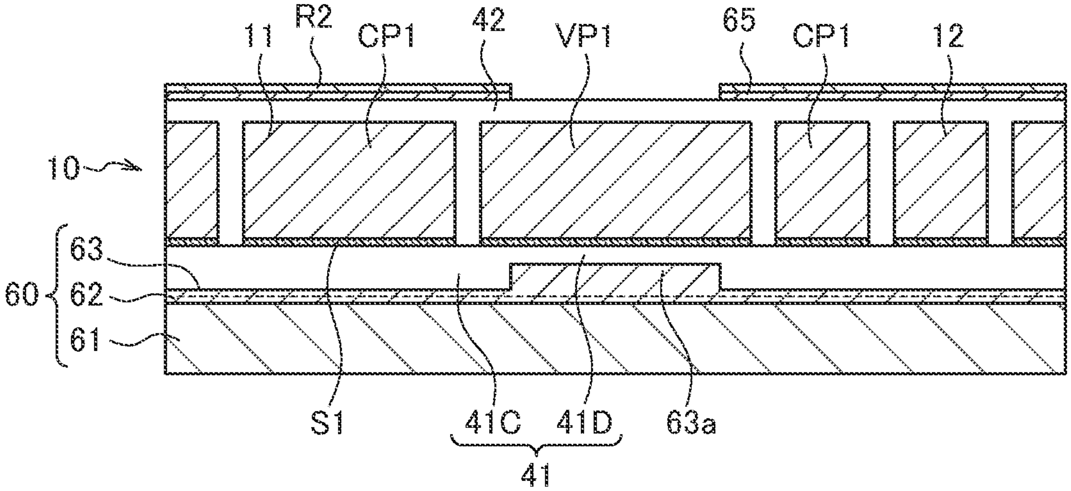
FIG. 17 is a process view for explaining the manufacturing method for the coil component 1.
Figure 18:
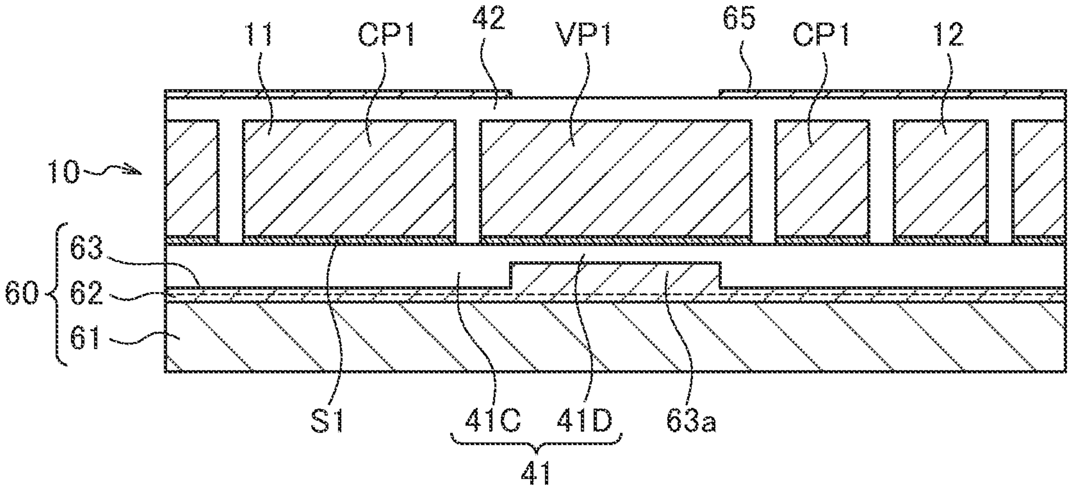
FIG. 18 is a process view for explaining the manufacturing method for the coil component 1.

After peeling of the resist pattern R1 (FIG. 13), a part of the seed layer S1 that is exposed to the peeling portion of the resist pattern R1 is removed by etching (FIG. 14). As a result, the coil pattern CP1 and the sacrificial pattern VP1 are electrically isolated by a slit SL. Subsequently, the interlayer insulating film 42 and a metal foil 65 are formed on the surface of the conductor layer 10 so as to fill the slit SL (FIG. 15). The interlayer insulating film 42 and metal foil 65 can be formed by a laminate method. Then, a resist pattern R2 is formed on the surface of the metal foil 65 (FIG. 16), and the metal foil 65 is etched with the resist pattern R2 as a mask (FIG. 17). As a result, a part of the metal foil 65 that overlaps the sacrificial pattern VP1 is removed.

Figure 19:
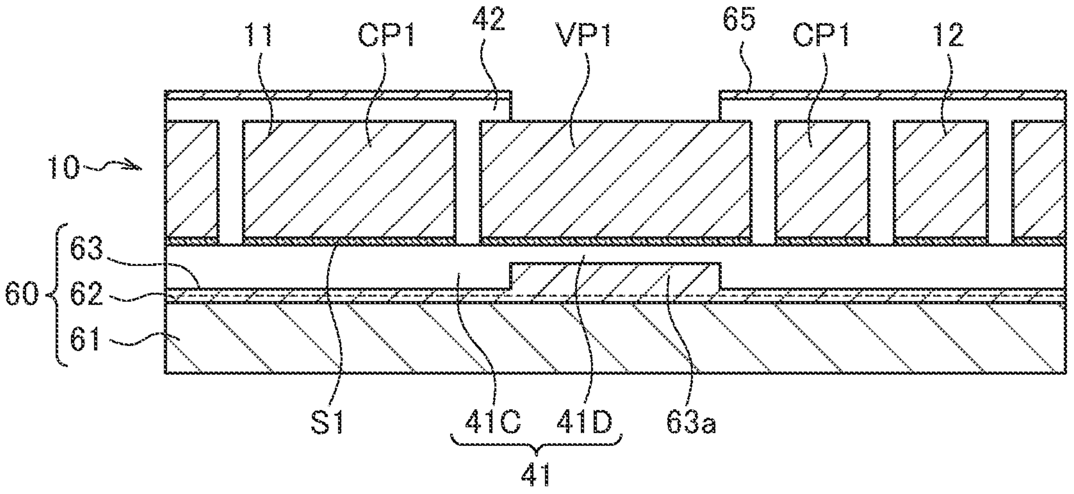
FIG. 19 is a process view for explaining the manufacturing method for the coil component 1.
Figure 20:
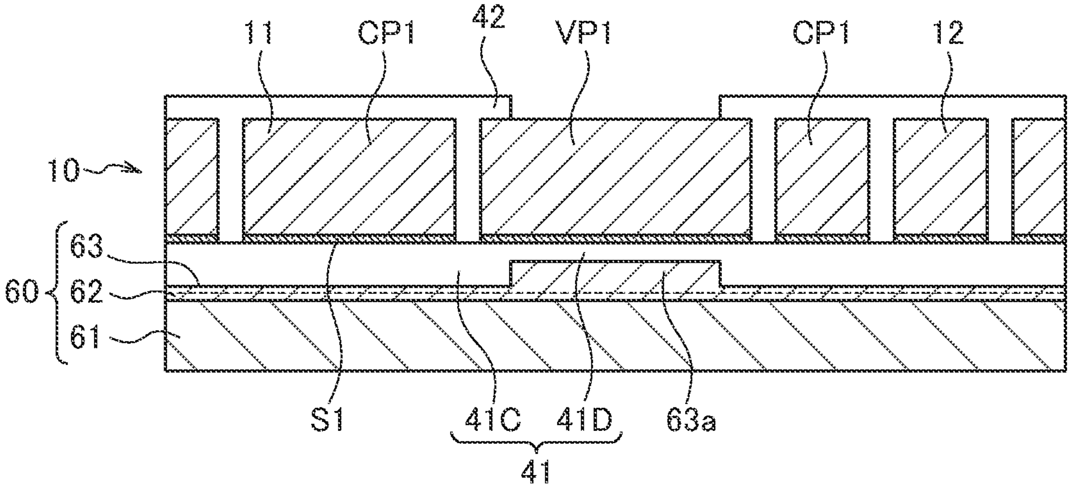
FIG. 20 is a process view for explaining the manufacturing method for the coil component 1.
Figure 21:
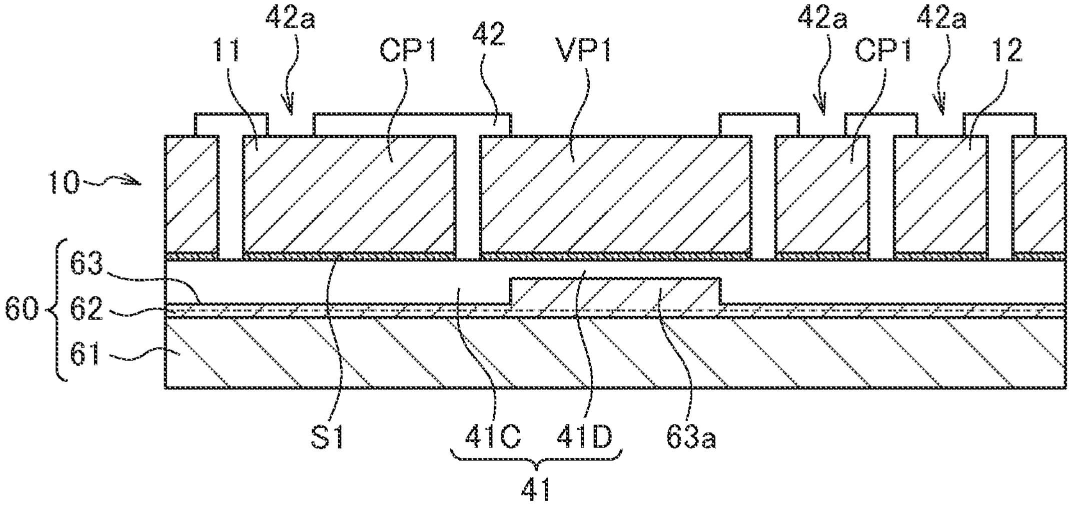
FIG. 21 is a process view for explaining the manufacturing method for the coil component 1.
Figure 22:
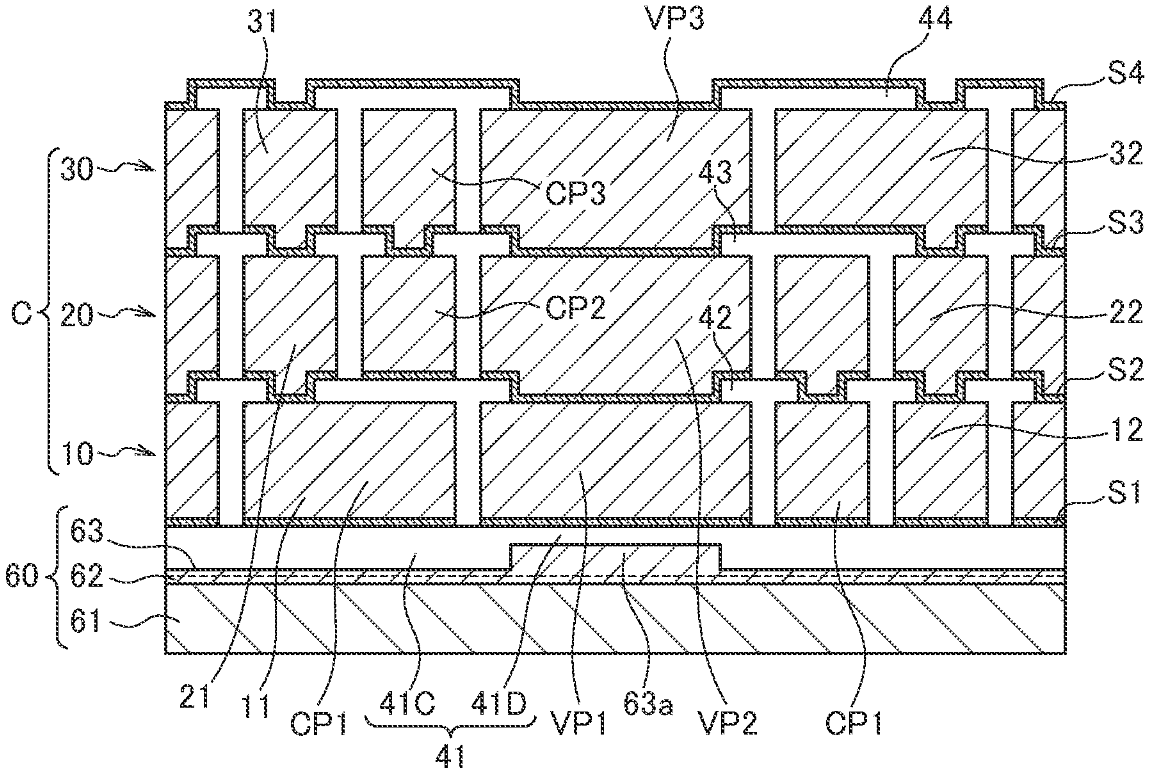
FIG. 22 is a process view for explaining the manufacturing method for the coil component 1.

After peeling of the resist pattern R2 (FIG. 18), blasting is performed with the metal foil 65 as a mask to expose the sacrificial pattern VP1 (FIG. 19). Then, after removal of the metal foil 65 (FIG. 20), laser machining is performed to form opening parts 42*a* in the interlayer insulating film 42. The opening parts 42*a* are formed at positions where the via conductors 51, 53, and 56 illustrated in FIG. 3 are to be formed. Through the above processes, the formation of the conductor layer 10 and interlayer insulating film 42 is completed.

Figure 23:
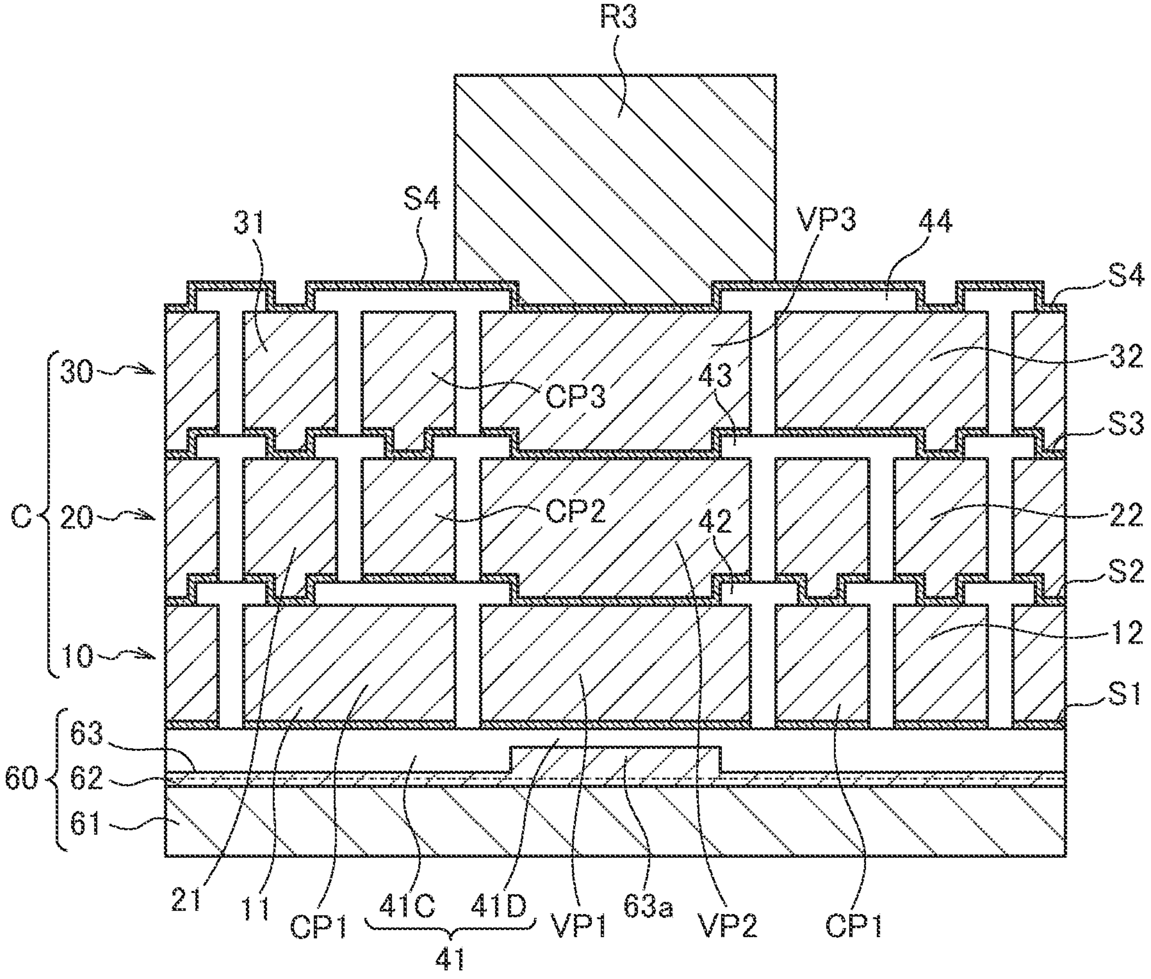
FIG. 23 is a process view for explaining the manufacturing method for the coil component 1.
Figure 24:
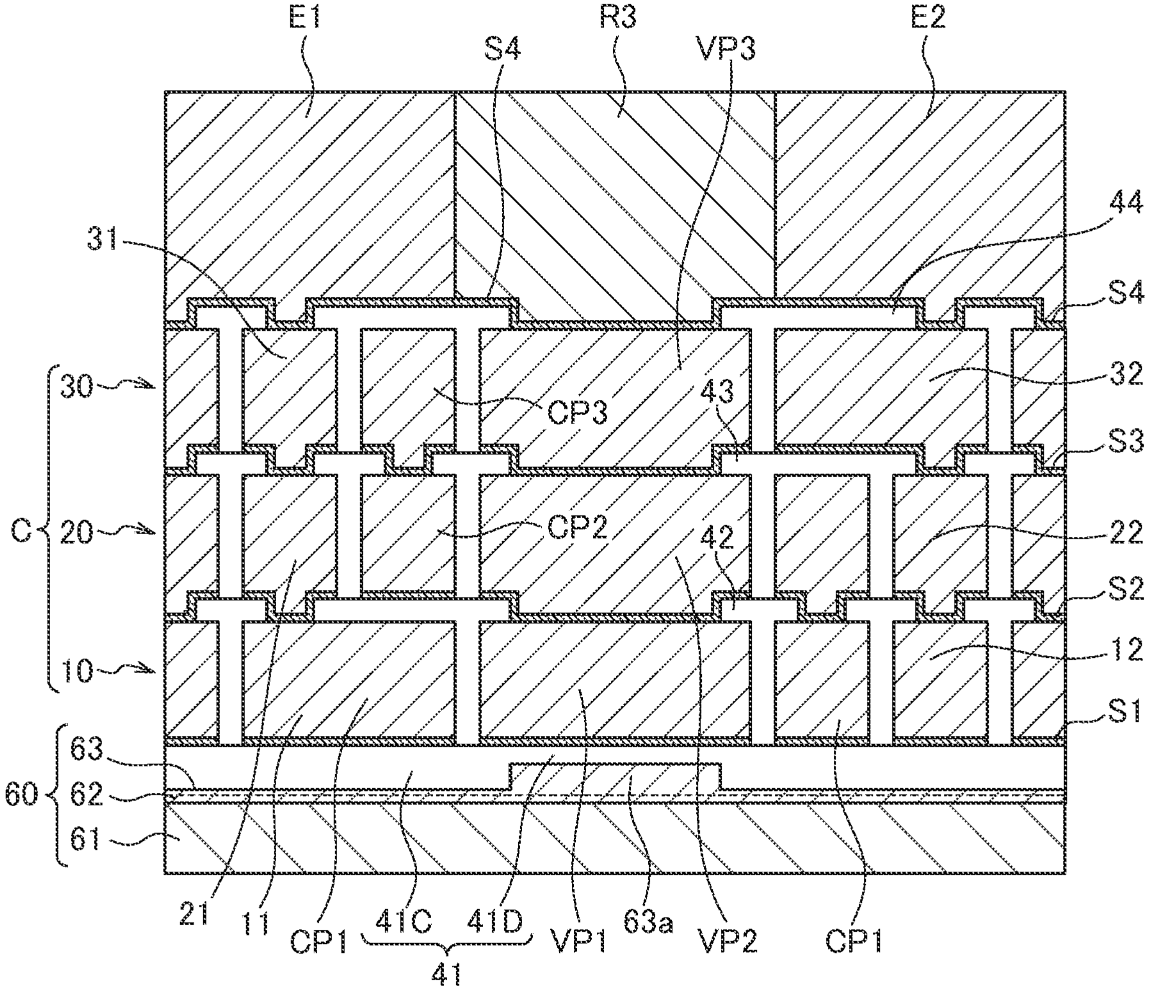
FIG. 24 is a process view for explaining the manufacturing method for the coil component 1.
Figure 25:
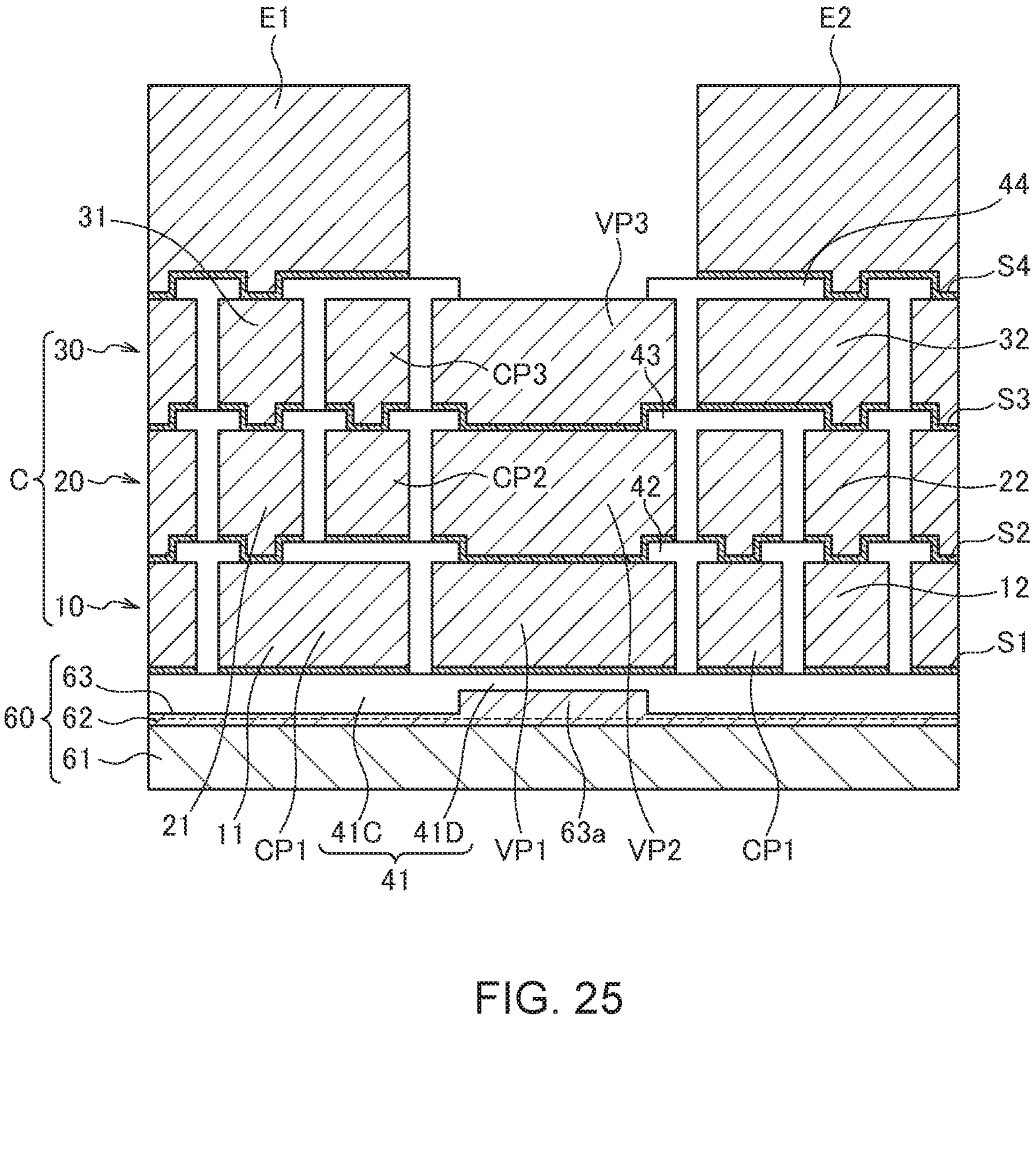
FIG. 25 is a process view for explaining the manufacturing method for the coil component 1.

Thereafter, by repeating the processes illustrated in FIGS. 10 to 21, the conductor layer 20, interlayer insulating film 43, conductor layer 30, and interlayer insulating film 44 are sequentially formed. Then, after formation of a seed layer S4 on the surface of the interlayer insulating film 44 (FIG. 22), a resist pattern R3 is formed on the surface of the seed layer S4 (FIG. 23). In this state, electrolytic plating is performed to grow the seed layer S4 to thereby form the external terminals E1 and E2 (FIG. 24). After that, the resist pattern R3 is peeled off, and a part of the seed layer S4 that is exposed to the peeling portion of the resist pattern R3 is removed by etching (FIG. 25).

Figure 26:
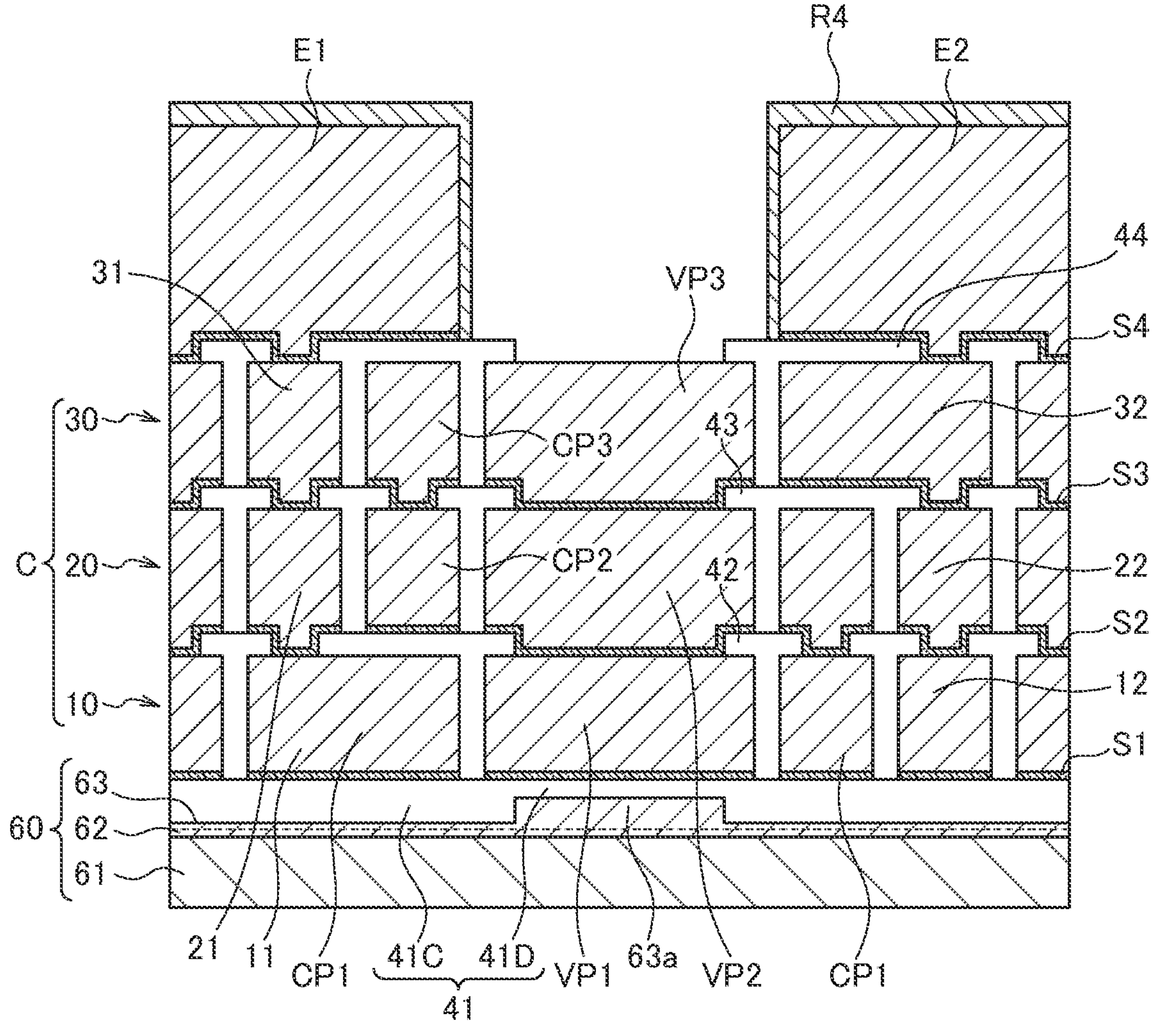
FIG. 26 is a process view for explaining the manufacturing method for the coil component 1.
Figure 27:
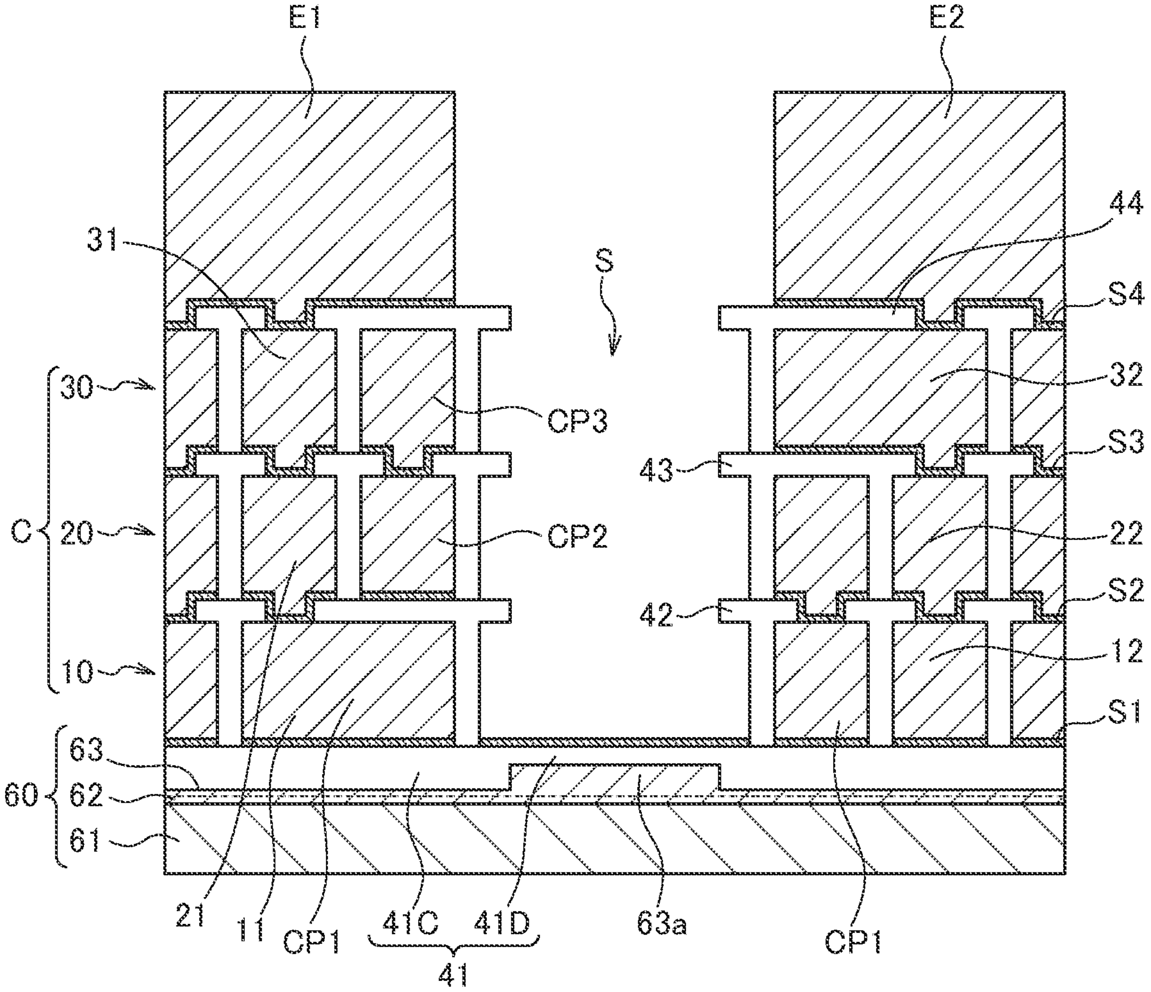
FIG. 27 is a process view for explaining the manufacturing method for the coil component 1.

Then, the external terminals E1 and E2 are covered with a resist pattern R4 (FIG. 26). In this state, wet-etching is performed to remove the sacrificial patterns VP1 to VP3 (FIG. 27). The coil patterns CP1 to CP3 are covered with the interlayer insulating films 41 to 44 and are thus not etched. As a result, a space S is formed in the inner and outer diameter areas of each of the coil patterns CP1 to CP3.

Figure 28:
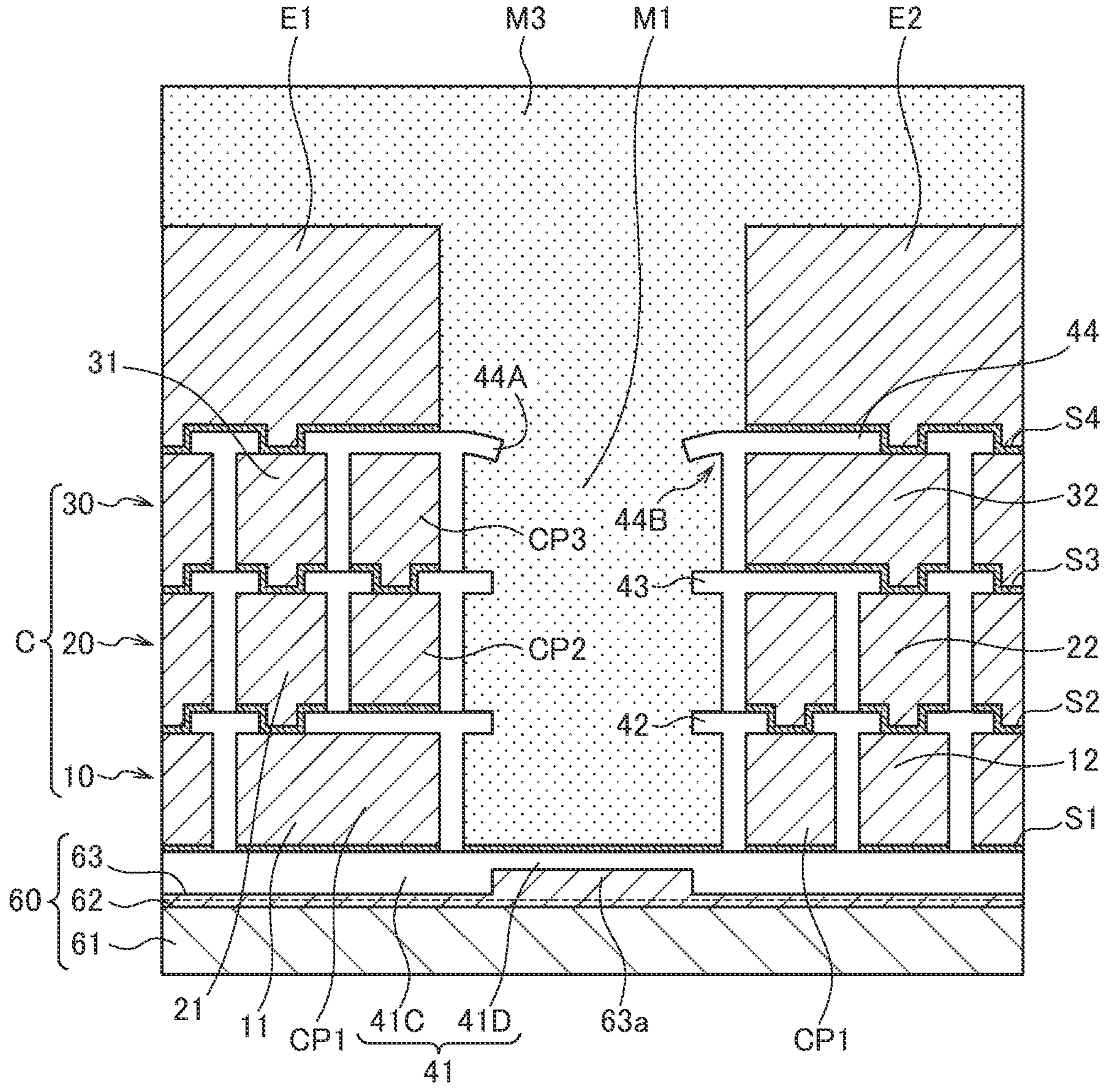
FIG. 28 is a process view for explaining the manufacturing method for the coil component 1.
Figure 29:
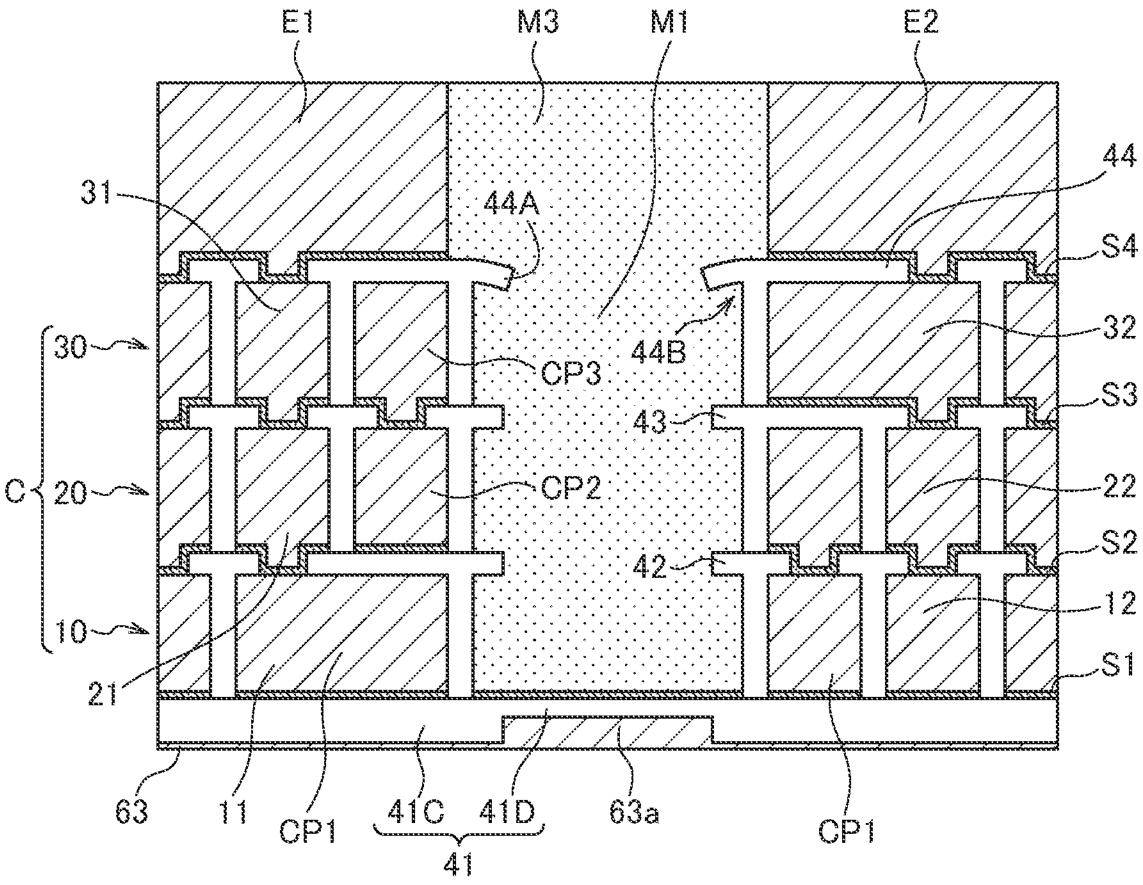
FIG. 29 is a process view for explaining the manufacturing method for the coil component 1.
Figure 30:
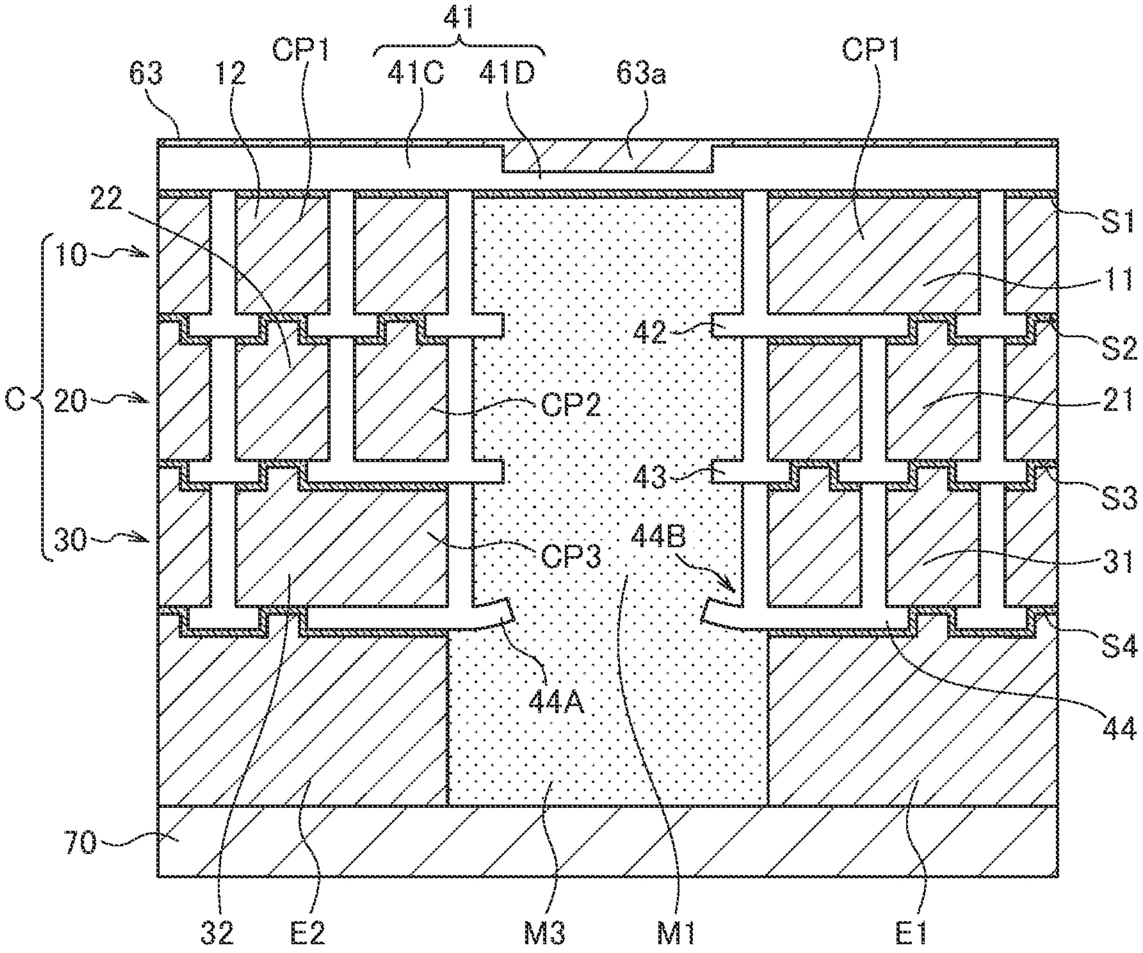
FIG. 30 is a process view for explaining the manufacturing method for the coil component 1.
Figure 31:
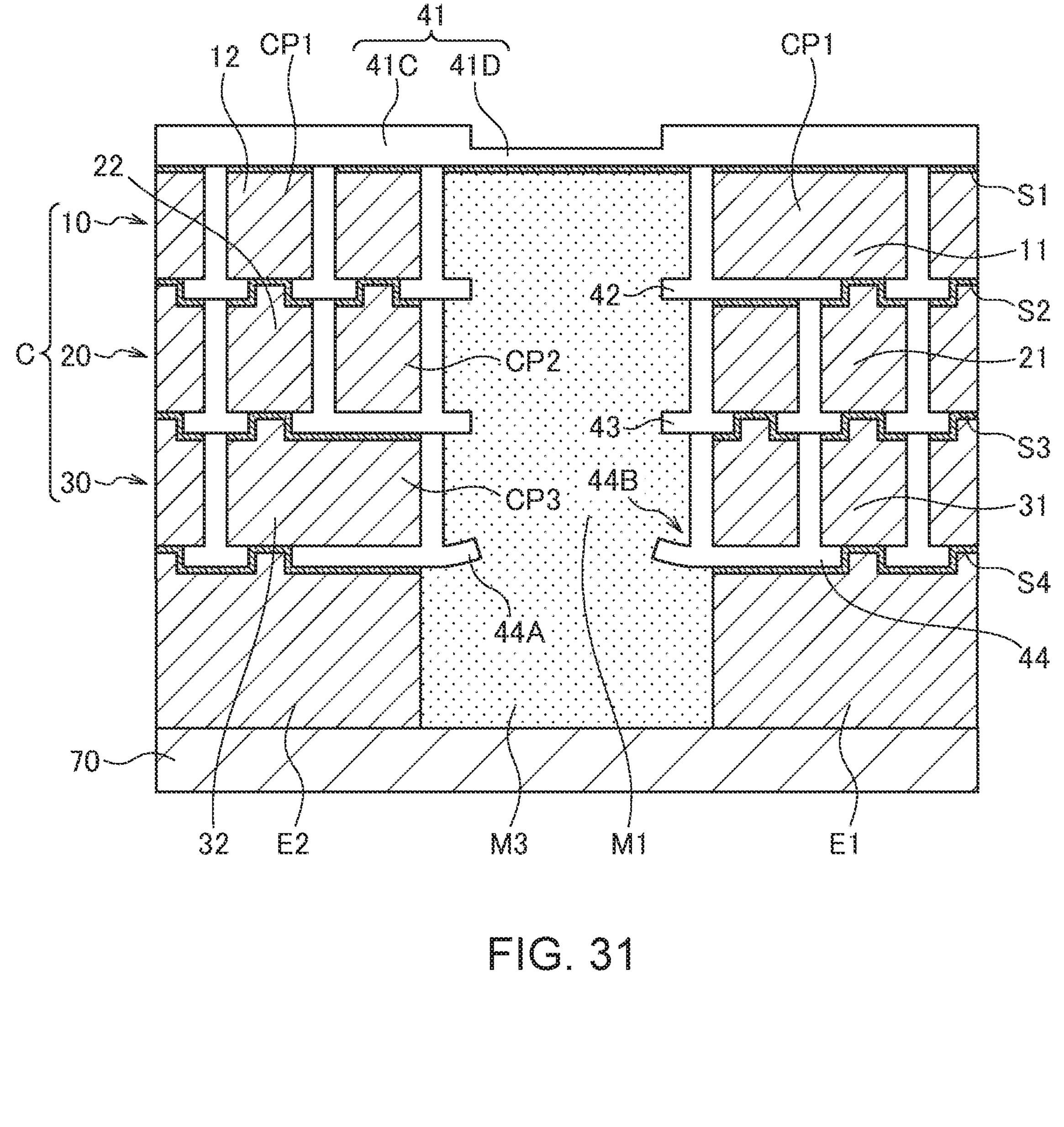
FIG. 31 is a process view for explaining the manufacturing method for the coil component 1.
Figure 32:
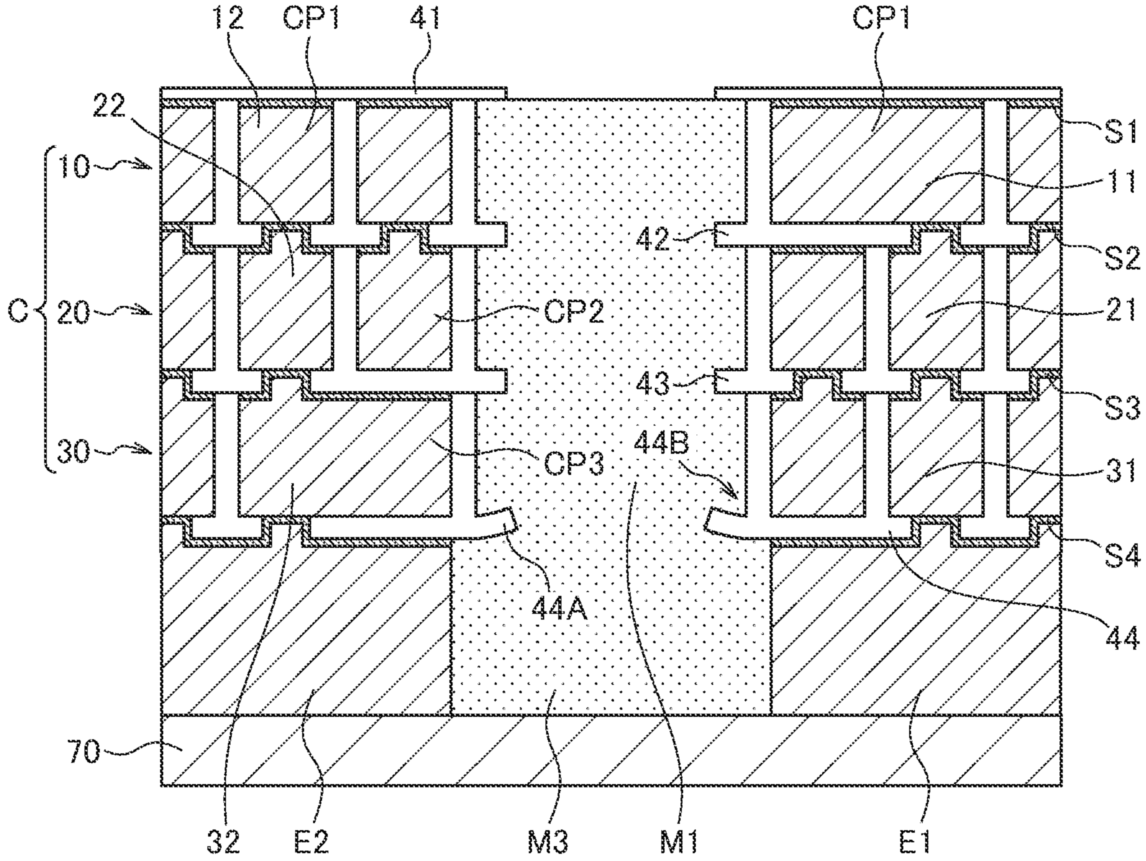
FIG. 32 is a process view for explaining the manufacturing method for the coil component 1.

Then, the magnetic element bodies M1 and M3 are formed to fill the space S (FIG. 28). In the formation of the magnetic element bodies M1 and M3, the magnetic element bodies M1 and M3 are strongly pressed toward the support 60 so as not to generate a void. As a result, the protruding part 44A constituting a part of the interlayer insulating film 44 is curved in the pressed direction. Then, the metal foils 62 and 63 are peeled off at the interface therebetween to remove the support 60, and the surface of the magnetic element body M3 is ground to expose the external terminals E1 and E2 (FIG. 29). Then, after inverting up and down, a support 70 is stuck (FIG. 30), followed by removal of the metal foil 63 by etching (FIG. 31). In this state, asking is performed to reduce the film thickness of the interlayer insulating film 41 as a whole (FIG. 32). The reduction amount of the film thickness is adjusted to such a value that the small thickness area 41D is completely removed, while the large thickness area 41C remains. As a result, the magnetic element body M1 filled in the inner diameter area of the coil part C is exposed, and the protruding part 41A is formed in the interlayer insulating film 41.

Figure 33:
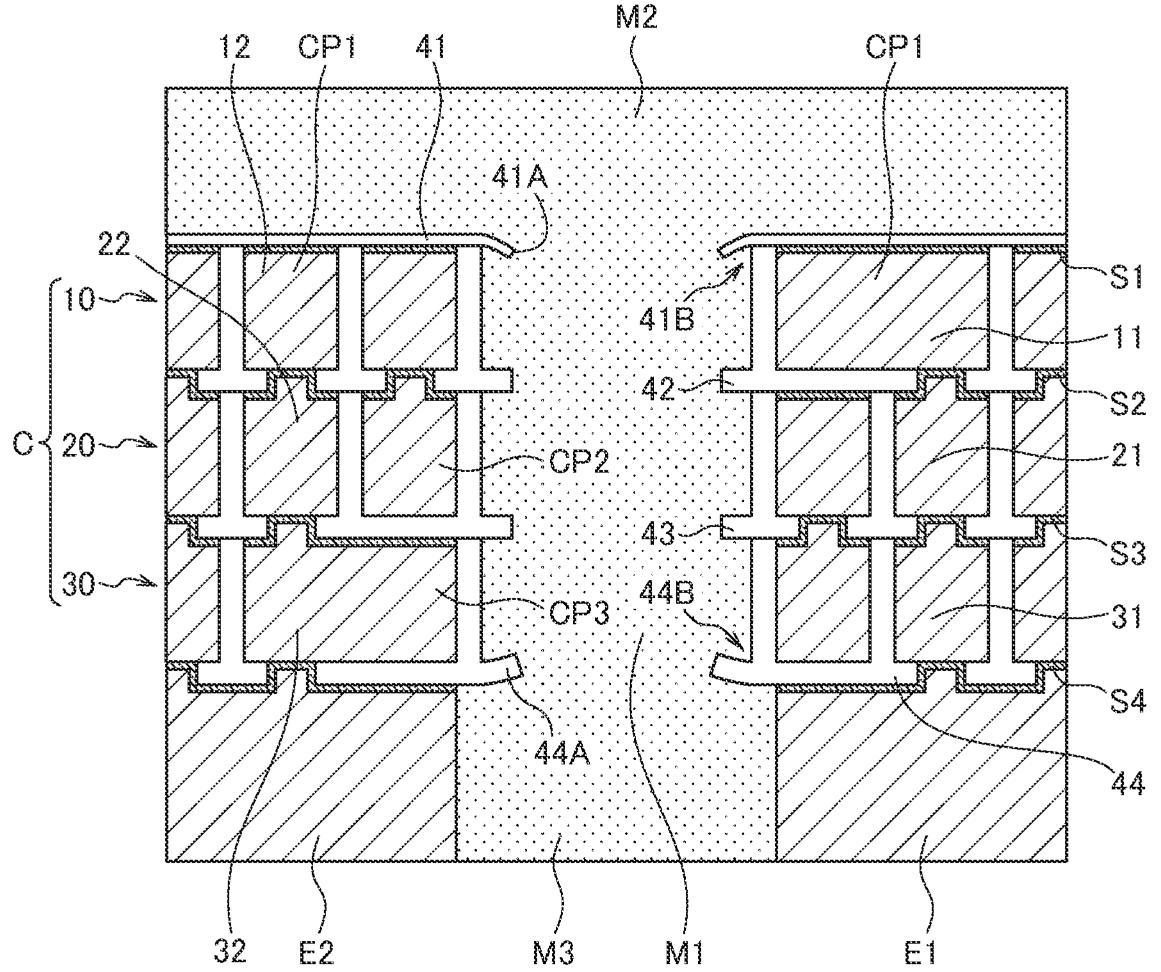
FIG. 33 is a process view for explaining the manufacturing method for the coil component 1.
Figure 34:
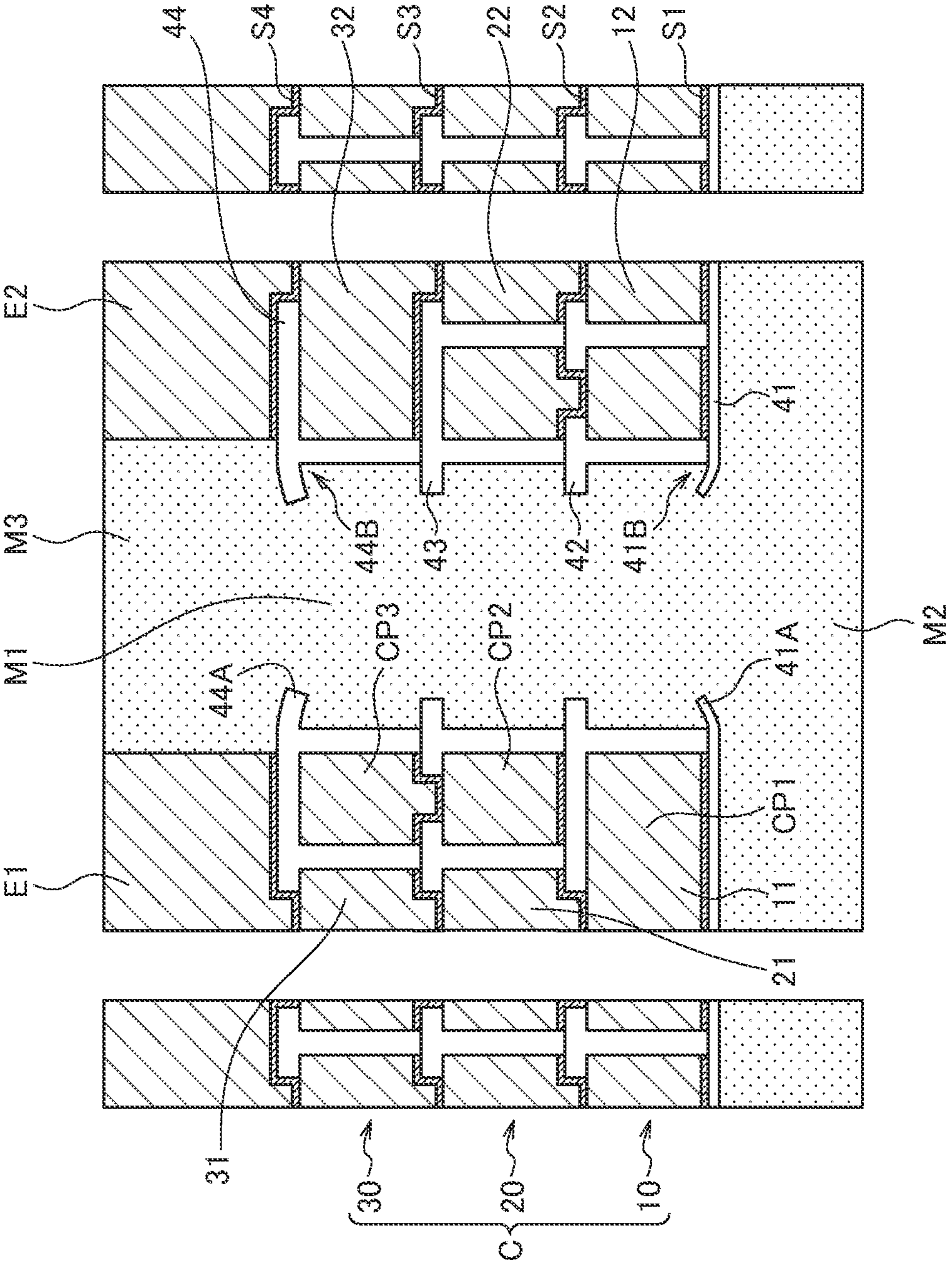
FIG. 34 is a process view for explaining the manufacturing method for the coil component 1.

Then, the magnetic element body M2 is formed so as to cover the interlayer insulating film 41 (FIG. 33). In the formation of the magnetic element body M2, the magnetic element body M2 is strongly pressed toward the support 70 so as not to generate a void. As a result, the protruding part 41A constituting a part of the interlayer insulating film 41 is curved in the pressed direction. Finally, dicing is performed for singulation, whereby the coil component 1 according to the present invention is completed (FIG. 34). In order to reliably obtain the curved shape of the protruding parts 41A and 44A of the interlayer insulating films, the magnetic element bodies M1 to M3 in a semi-cured state may be pressed and then subjected to complete curing.

As described above, in the present embodiment, the magnetic element bodies M1 to M3 are strongly pressed so as to curve inward the protruding parts 41A and 44A of the interlayer insulating films 41 and 44, so that the entrance of a magnetic path passing through the inner diameter area can be made wider than when the protruding parts 41A and 44A linearly protrude.

Further, in the present embodiment, the interlayer insulating film 41 is laminated on the surface of the metal foil 63 having the protruding part 63*a*, thus allowing the shape of the protruding part 63*a* to be transferred to the interlayer insulating film 41. As a result, the interlayer insulating film 41 has the large thickness area 41C and small thickness area 41D, so that the film thickness thereof can be further reduced by the asking (FIG. 32). This can reduce the height of the coil component 1 and can curve the protruding part 41A more significantly.

While the preferred embodiment of the present invention has been described, the present invention is not limited to the above embodiment, and various modifications may be made within the scope of the present invention, and all such modifications are included in the present invention.

REFERENCE SIGNS LIST

1 coil component
10, 20, 30 conductor layer
11, 12, 21, 22, 31, 32 electrode pattern
41-44 interlayer insulating film
41A, 44A protruding part
41B, 44B corner part
41C large thickness area
41D small thickness area
42*a* opening part
51-58 via conductor
60 support
61 base
62-65 metal foil
63*a* protruding part
70 support
C coil part
CP1-CP3 coil pattern
E1, E2 external terminal
M1-M3 magnetic element body
R1-R4 resist pattern
S space
S1-S4 seed layer
SL slit
VP1-VP3 sacrificial pattern

What is claimed is:

1. A coil component comprising:

a spirally wound coil pattern;

a first interlayer insulating film covering the coil pattern from one side in an axial direction of the coil pattern; and a magnetic element body including a first part filled in the inner diameter area of the coil pattern and a second part covering the coil pattern from the one side in the axial direction through the first interlayer insulating film, wherein the first interlayer insulating film has a first protruding part radially protruding to the inner diameter area, and wherein the first protruding part is curved to other side in the axial direction.

2. The coil component as claimed in claim 1, further comprising a second interlayer insulating film covering the coil pattern from the other side in the axial direction, wherein the magnetic element body further includes a third part covering the coil pattern from the other side in the axial direction through the second interlayer insulating film.

3. The coil component as claimed in claim 2, further comprising first and second external terminals connected respectively to one end and other end of the coil pattern each through an opening portion formed in the second interlayer insulating film, wherein the first interlayer insulating film is smaller in film thickness than the second interlayer insulating film.

4. The coil component as claimed in claim 3, wherein the second interlayer insulating film has a second protruding part radially protruding to the inner diameter area, and wherein the second protruding part is curved to the one side in the axial direction.

5. The coil component as claimed in claim 4, wherein the first protruding part is curved more significantly than the second protruding part.

6. The coil component as claimed in any one of claims 1 to 5, wherein the magnetic element body comprises a composite member containing magnetic filler and a resin binder, and wherein a protruding amount of the first protruding part is smaller than a maximum diameter of the magnetic filler.

7. A method for manufacturing a coil component, the method comprising:

a first step of forming a spirally wound coil pattern covered with an interlayer insulating film from one side in an axial direction thereof;

a second step of forming, in the interlayer insulating film, a protruding part radially protruding to an inner diameter area of the coil pattern; and a third step of filling the inner diameter area of the coil pattern with a magnetic element body and covering the coil pattern with the magnetic element body from the one side in the axial direction through the interlayer insulating film, wherein, in the third step, the magnetic element body is pressed toward other side in the axial direction so as to curve the first protruding part to the other side in the axial direction.

8. The method for manufacturing a coil component as claimed in claim 7, wherein the first step includes a step of forming the interlayer insulating film such that a part of the interlayer insulating film that overlaps the inner diameter area of the coil pattern when viewed in the axial direction includes a large thickness area and a small thickness area, and wherein the second step reduces the film thickness of the interlayer insulating film as a whole to remove the small thickness area to thereby form the protruding part.

* * * * *